United States Patent
Christian et al.

[11] Patent Number: 6,163,822
[45] Date of Patent: Dec. 19, 2000

[54] TECHNIQUE FOR CONTROLLING AND PROCESSING A SECTION OF AN INTERACTIVE PRESENTATION SIMULTANEOUSLY WITH DETECTING STIMULUS EVENT IN MANNER THAT OVERRIDES PROCESS

[75] Inventors: Andrew D. Christian, Lincoln; Brian L. Avery, Lexington, both of Mass.

[73] Assignee: Compaq Computer Corporation, Houston, Tex.

[21] Appl. No.: 09/070,849

[22] Filed: May 4, 1998

[51] Int. Cl.[7] ............................. G06F 13/00; G06L 3/00
[52] U.S. Cl. ........................ 710/58; 710/20; 710/48; 709/218
[58] Field of Search ................. 709/218; 710/33, 710/20, 48, 58; 345/339; 395/326, 418

[56] References Cited

U.S. PATENT DOCUMENTS

| | | | |
|---|---|---|---|
| 4,644,582 | 2/1987 | Morishita et al. | 382/130 |
| 4,821,029 | 4/1989 | Logan et al. | 345/173 |
| 4,851,616 | 7/1989 | Wales et al. | 345/175 |
| 5,048,103 | 9/1991 | Leclerc | 382/294 |
| 5,067,015 | 11/1991 | Combridge et al. | 345/398 |
| 5,105,186 | 4/1992 | May | 345/175 |
| 5,280,610 | 1/1994 | Travis, Jr. et al. | 707/103 |
| 5,367,454 | 11/1994 | Kawamoto et al. | 395/326 |
| 5,376,947 | 12/1994 | Kurode | 345/173 |
| 5,408,417 | 4/1995 | Wilder | 705/5 |
| 5,440,744 | 8/1995 | Jacobson et al. | 709/203 |
| 5,504,675 | 4/1996 | Cragun et al. | 705/14 |
| 5,551,027 | 8/1996 | Choy et al. | 707/201 |
| 5,581,758 | 12/1996 | Burnett et al. | 704/103 |
| 5,630,017 | 5/1997 | Gasper et al. | 707/103 |
| 5,640,558 | 6/1997 | Li | 704/276 |
| 5,652,880 | 7/1997 | Seagraves | 707/103 |
| 5,652,882 | 7/1997 | Doktor | 707/201 |
| 5,657,426 | 8/1997 | Waters et al. | 704/276 |
| 5,732,232 | 3/1998 | Brush, II et al. | 345/339 |
| 5,768,142 | 6/1998 | Jacobs | 364/479.01 |
| 5,795,228 | 8/1998 | Trumbull et al. | 463/42 |
| 5,802,299 | 9/1998 | Logan et al. | 709/218 |
| 5,826,097 | 10/1998 | Miyama | 712/25 |
| 5,872,850 | 2/1999 | Klein et al. | 380/49 |

OTHER PUBLICATIONS

Describing Motion for Recognition, Little, et al., 1995 IEEE, pp. 235–240.

Compact Representation of Videos Through Dominant and Multiple Motion Estimation, Sawhney, et al. IEEE 1996, pp. 814–830.

3D Human Body Model Acquisition from Multiple Views, Kakadiaris, et al., IEEE, 1995, pp. 618–623.

Analyzing Articulated Motion Using Expectation—Maximization, Rowley, et al. *Computer Vision and Pattern Recognition,* San Juan, PR, Jun. 1997, Total of 7 pages.

Mixture Modesl for Optical Flo9r Computation, Jepson, et al., University of toronto, Depart of Computer Science, Apr. 1993, pp. 1–16.

Analyzing and Recognizing Walking Figures in XYT, Niyogi, et al. IEEE 1994, pp. 469–474.

Nonparametric Recognition of Nonrigid Motion, Polana, et al, Department of Computer Science, pp. 1–29.

Model–Based Tracking of Self–Occluding Articulated Objects. Rehg. Et al., *5th Intl. Conf. On Computer Vision,* Cambridge, MA, Jun. 1995 total of 6 pages.

(List continued on next page.)

*Primary Examiner*—Thomas C. Lee
*Assistant Examiner*—Tammara Peyton
*Attorney, Agent, or Firm*—Cesari and McKenna, LLP

[57] ABSTRACT

A technique for controlling an interactive presentation is disclosed. In one embodiment, a processing device receives at least one of a plurality of commands, wherein each of the plurality of commands corresponds to a respective operation the performance of which is directly associated with controlling a particular aspect of the interactive presentation. The processing device processes each of the received commands such that each corresponding operation is performed to control a particular aspect of the interactive presentation.

60 Claims, 4 Drawing Sheets

OTHER PUBLICATIONS

A Unified Mixture Framework For Motion Segmentation: Incorporating Spatial Coherence and Estimating The Number of Models, Weiss, et al., IEEE 1996, pp. 321–326.

Learning Visual Behaviour for Gesture Analysis, Wilson, et al. IEEE 1995, pp. 229–234.

Registration of Images with Geometric Distortions, Ardeshir Goshtasby, vol. 26, Jan. 1988, pp. 60–64.

The Integration of Optical Flow and Deformable Models with Applications to Human Face Shape and Motion Estimation, DeCarlo, et al IEEE 1996, pp. 231–238.

A Vision System for Observing and Extracting Facial Action Parameters, Essa, et al. IEEE 1994, pp. 76–83.

Realistic Modeling for Facial Animation, Lee, et al. Computer Graphics Proceedings Annual Conference Series, 1995 pp. 55–62.

Facial Feature Localization and Adaptation of a Generic Face Model for Model–Based Coding, Reinders, et al. Signal Processing: Image Communication vol. 7, pp. 57–74, 1995.

Real–time Recognition of Activity Using Temporatl Templates, Aaron F. Bobick, et al. *The Workshop on Applications of Computer Vision* Dec. 1996, pp. 1–5.

TECHNIQUE FOR CONTROLLING AND PROCESSING A SECTION OF AN INTERACTIVE PRESENTATION SIMULTANEOUSLY WITH DETECTING STIMULUS EVENT IN MANNER THAT OVERRIDES PROCESS

FIELD OF THE INVENTION

The present invention relates generally to public kiosks and, more particularly, to a technique for controlling an interactive presentation.

BACKGROUND OF THE INVENTION

Public kiosks are generally freestanding computer systems which provide services to a variety of users. For example, a public kiosk may provide information, advertising, or act as a point-of-sale device. Many car rental agencies use public kiosks to provide navigation directions to drivers unfamiliar with local areas. An automatic teller machine (ATM) is another form of public kiosk that provides a service to a user. A gas station pump with a credit card reader is a form of point-of-sale public kiosk.

Traditional public kiosks typically include a video display and either a keypad or a touchscreen panel. The video display can be used as an attraction device, but can also provide messages and feedback to a user. The keypad or touchscreen panel allows a user to interact with the public kiosk so as to, for example, submit queries to or answer questions posed by the public kiosk.

The interaction between a traditional public kiosk and a user is generally limited by the capabilities of a computer system that is resident within the public kiosk. That is, the public kiosk is typically controlled by a software program that is continuously running on a resident computer system. The software program typically comprises a number of subroutines that are called in response to inputs that are received from a user. The inputs are typically relayed through the keypad or touchscreen panel.

The software program is typically provided by a manufacturer of the public kiosk, and thus has to be serviced, upgraded, and/or customized by the manufacturer or someone authorized or capable of performing such a task. The servicing, upgrading, and/or customizing of the software program can be a costly and time-consuming task. For example, a prospective purchaser of a public kiosk would need to provide detailed presentation information to a manufacturer or other software developer in order to develop a custom software program for use in the public kiosk. The manufacturer or other software developer would then also probably be needed to service and upgrade the custom software program, if such were needed.

In view of the foregoing, it is apparent that the development and maintenance of software programs for controlling traditional public kiosks can be costly and time-consuming. Accordingly, it would be desirable to provide an efficient technique for developing and maintaining a software program for controlling a computerized public kiosk.

OBJECTS OF THE INVENTION

The primary object of the present invention is to provide an efficient technique for controlling an interactive presentation.

The above-stated primary object, as well as other objects, features, and advantages, of the present invention will become readily apparent from the following detailed description which is to be read in conjunction with the appended drawings.

SUMMARY OF THE INVENTION

According to the present invention, an efficient technique for controlling an interactive presentation is provided. The technique can be realized by having a processing device such as, for example, digital computer, receive at least one of a plurality of commands. Each of the plurality of commands corresponds to a respective operation the performance of which is directly associated with controlling a particular aspect of the interactive presentation. The interactive presentation can be, for example, an interactive display of a computerized public kiosk. The particular aspect of the interactive presentation can be, for example, the generation of a computer generated face or the display of a hypertext markup language (HTML) web page on a monitor of the computerized public kiosk. The processing device processes each of the received commands such that each corresponding operation is performed to control a particular aspect of the interactive presentation.

The processing device typically receives at least two of the plurality of commands in a sequential order, and then processes each of the received commands in the sequential order.

The plurality of commands can be classified as either synchronous commands for performing corresponding synchronous operations, or asynchronous commands for performing corresponding asynchronous operations. A synchronous command is processed by the processing device such that a corresponding synchronous operation must be performed in its entirety before the processing device can begin to process a subsequent command. For example, the processing device can first receive a synchronous command for performing a corresponding synchronous operation, and then receive a second command. The processing device will process the second command only after the synchronous operation corresponding to the synchronous command is performed in its entirety.

In one aspect of the present invention, a synchronous command can include a reference to a file to be processed by the processing device. For example, a synchronous command can include a reference to a text file which is processed by the processing device so as to control the generation of a computer generated face on a monitor of the computerized public kiosk.

In another aspect of the present invention, a synchronous command can include associated text to be processed by the processing device. For example, a synchronous command can include a textual phrase which is processed by the processing device so as to control the generation of a computer generated face on a monitor of the computerized public kiosk.

In a further aspect of the present invention, a synchronous command can include an associated parameter to be processed by the processing device. For example, a synchronous command can include a numerical value which is processed by the processing device so as to cause the processing device to suspend processing of any subsequent commands until after a time period corresponding to the numerical value has elapsed.

An asynchronous command is processed by the processing device such that a corresponding asynchronous operation need not be performed in its entirety before the processing device can begin to process a subsequent command. For example, the processing device can first receive an asynchronous command for performing a corresponding asynchronous operation, and then receive a second command. The processing device can begin to process the second command before the asynchronous operation corresponding to the asynchronous command is performed in its entirety.

In a further aspect of the present invention, an asynchronous command can include a reference to a file to be processed by the processing device. For example, an asynchronous command can include a reference to an HTML file which is processed by the processing device so as to control the display of an HTML web page on a monitor of the computerized public kiosk.

Each of the received commands includes an operational parameter. The operational parameter can be an absolute reference or a relative reference such as, for example, an URL. The operational parameter can also be associated text such as, for example, a textual phrase, as described above. The operational parameter can further be a command associated with an operating system of the processing device. The operational parameter can additionally be a reference to a file, as described above.

In a further aspect of the present invention, the processing device can log an event such as, for example, an input from a user of the computerized public kiosk. The processing device can then process the logged event by, for example, referencing a file or referencing a location within a file.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF A PREFERRED EMBODIMENT

Figure 1:
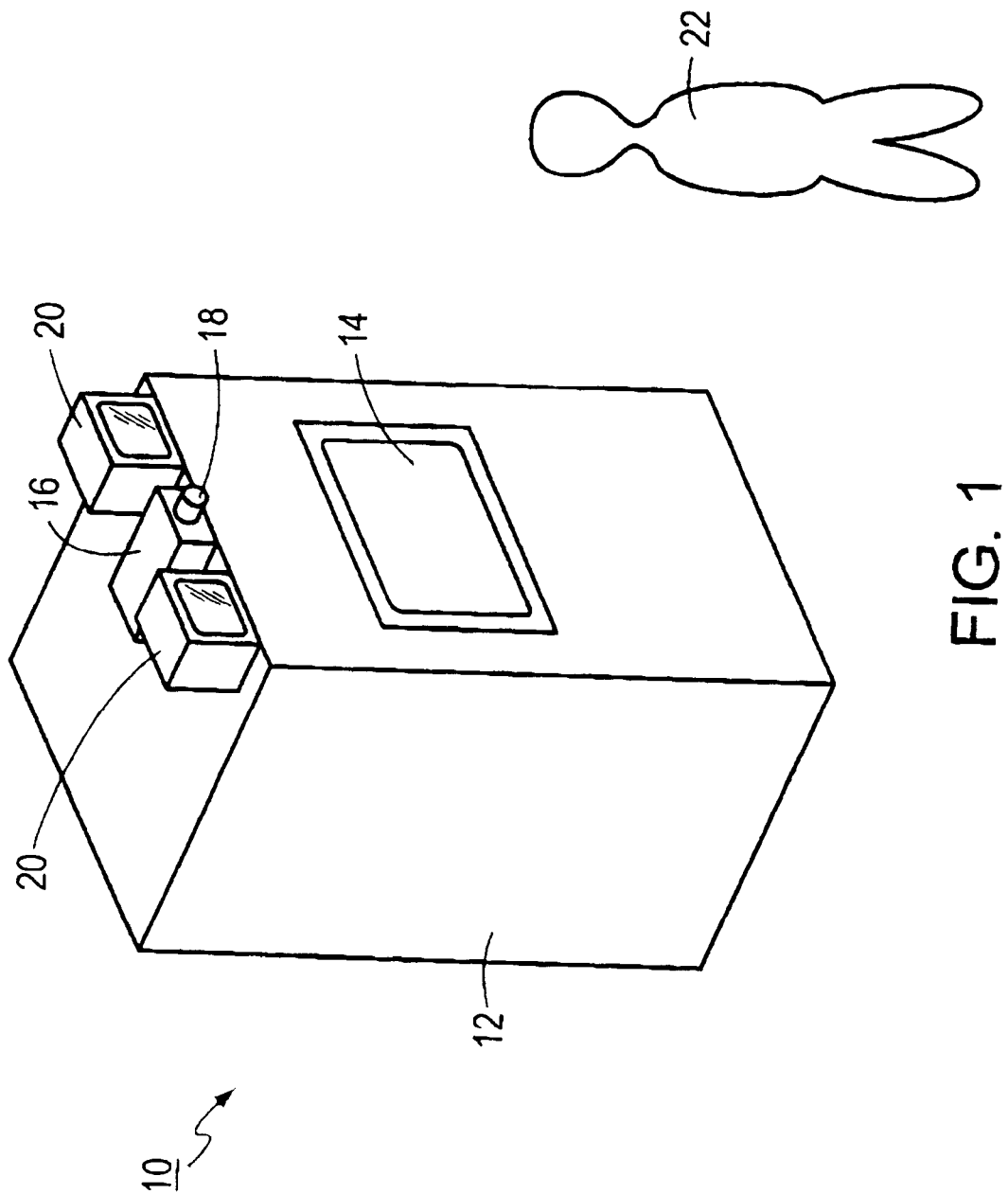
FIG. 1 shows a public kiosk having a touchscreen monitor in accordance with the present invention.

Referring to FIG. 1, there is shown a public kiosk 10 comprising a cabinet 12 having a touchscreen monitor 14 mounted therein for providing an interactive display. A video camera 16, preferably having a wide angle lens 18, is mounted on top of the cabinet 12. A pair of speakers 20, preferably stereo speakers, are also mounted on top of the cabinet 12.

The touchscreen monitor 14 is positioned such that a human 22 within the vicinity of the kiosk 10 can view and manipulate an interactive display on the touchscreen monitor 14. The video camera 16 is positioned such that the presence or absence of a human 22 or other object can be detected within the vicinity of the kiosk 10. It should be noted that the video camera 16 could alternatively be mounted within the cabinet 12, similar to the touchscreen monitor 14, as long as the field of vision of the video camera 16 is not hindered in any way. It should also be noted that, instead of or in addition to the video camera 16, other devices such as, for example, a Doppler radar, may be used to detect the presence of a human 22 or other object.

The pair of speakers 20 are positioned such that an audio signal transmitted from the pair of speakers 20 can be heard by a human 22 within the vicinity of the kiosk 10. It should be noted that the pair of speakers 20 could alternatively be mounted within the cabinet 12, similar to the touchscreen monitor 14, as long as the audible range of the pair of speakers 20 is not hindered in any way.

The cabinet 12 houses a processing device that receives input data from the video camera 16 and the touchscreen monitor 14, and transmits output data to the touchscreen monitor 14 for controlling an interactive display and to the pair of speakers 20 for controlling an audio signal. As described in more detail below, the cabinet 12 can also house other components, and the processing device can also receive input data from and transmit output data to other components.

Figure 2:
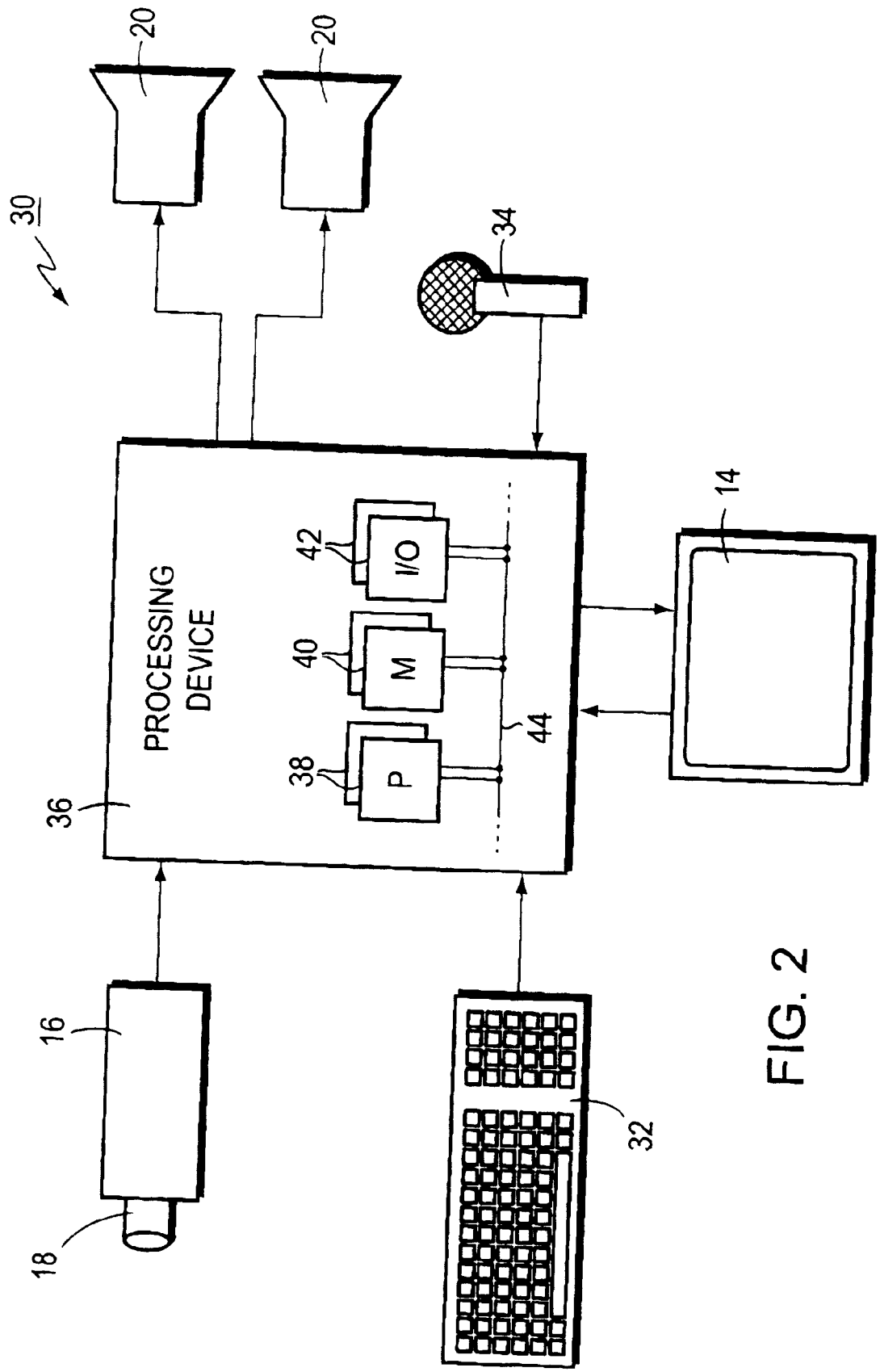
FIG. 2 is a schematic diagram of a processing system in accordance with the present invention.

Referring to FIG. 2, there is shown a schematic diagram of a processing system 30 comprising the touchscreen monitor 14, the video camera 16, and the pair of speakers 20. The processing system 30 also comprises a keyboard 32, a microphone 34, and a processing device 36. As previously mentioned, the processing device 36 receives input data from the video camera 16 and the touchscreen monitor 14, and transmits output data to the touchscreen monitor 14 for controlling an interactive display and to the pair of speakers 20 for controlling an audio signal. The processing device 36 can also receive input data from the keyboard 32 and the microphone 34. It should be noted that the processing system 30 may comprise other components (e.g., a Doppler radar to detect objects), and the processing device 38 may receive input data from and transmit output data to other components.

The processing device 36 is preferably a digital computer that allows for multitasking. In an alternative embodiment, the processing device 36 may be configured as several digital computers, which may communicate through one or more network connections. In any event, at least part of the processing device 36 is configured as a web server for storing kiosk content and control information, as will be described in more detail below.

The processing device 36 processes input data that is received from the touchscreen monitor 14, the video camera 16, the keyboard 32, and the microphone 34, and generates output data that is transmitted to the touchscreen monitor 14 and the pair of speakers 20. The processing of the input data and the generation of the output data are preferably implemented by software programs in the processing device 36. Thus, the processing device 36 preferably comprises at least one processor (P) 38, memory (M) 40, and input/output (I/O) interface 42, connected to each other by a bus 44, for implementing the processing of the input data and the generation of the output data. That is, the processing device 36 preferably receives input data from the touchscreen monitor 14, the video camera 16, the keyboard 32, and the microphone 34 via the I/O interface 42, processes the input data and generates the output data via the processor 38 and the memory 40, and transmits the output data to the touchscreen monitor 14 and the pair of speakers 20 via the I/O interface 42.

The processing device 36 can process input data from the video camera 16 according to image processing techniques such as have been described in U.S. patent application Ser. No. 09/019,548, entitled *Technique for Processing Images*, in U.S. patent application Ser. No. 09/020,035, entitled *Technique for Differencing an Image*, in U.S. patent application Ser. No. 09/020,043, entitled *Technique for Locating*

Objects within an Image, in U.S. patent application Ser. No. 09/020,203, entitled *Technique for Classifying Objects within an Image,* in U.S. patent application Ser. No. 09/045,877, entitled *Technique for Disambiguating Objects within an Image* in U.S. patent application Ser. No. 09/020,044, entitled *Technique for Tracking Objects Through a Series of Images,* and in U.S. patent application Ser. No. 09/019,549, entitled *Technique for Updating a Background Image,* all filed by Christian et al. on Feb. 6, 1998, and which are hereby incorporated herein by reference. The image processing techniques disclosed therein allow an object to be located, classified, disambiguated, and tracked through a series of captured images. Such image processing techniques can be incorporated into the present invention to control the kiosk 10 in accordance with the present invention.

It should be noted that input data from the other components in the data processing system 30, namely the touchscreen monitor 14, the keyboard 32, and the microphone 34, can also be processed by the processing device 36 to control the kiosk 10 in accordance with the present invention. The processing of the input data from these other components in the processing system 30 will be described in detail below.

Figure 3:
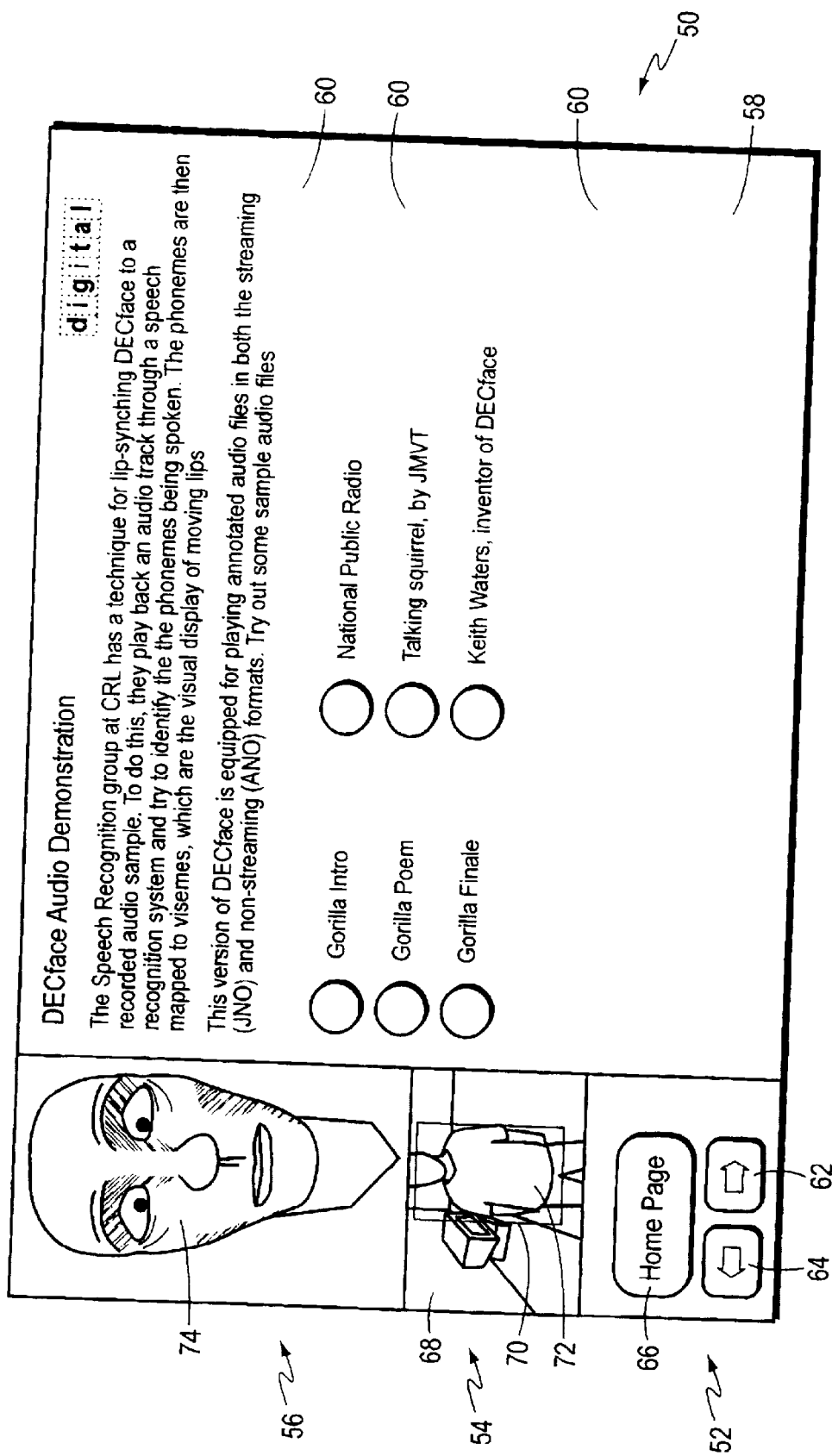
FIG. 3 shows an example of an interactive display on a touchscreen monitor in accordance with the present invention.

As previously mentioned, the processing device 36 transmits output data to the touchscreen monitor 14 for controlling an interactive display. The interactive display can take many forms, one of which comprising a textual and graphical information section 50, a navigation section 52, an imaging section 54, and animation section 56, as shown in FIG. 3. The textual and graphical information section 50 typically comprises a web page 58 being displayed by a web browser, which is being run by the processing device 36. The contents of the web page 58 are typically accessible from the portion of the processing device 36 that is configured as the web server. That is, the contents of the web page 58 are typically located in a hypertext markup language (HTML) file that is stored on the web server. As shown, the web page 58 comprises touchscreen buttons 60, which are typically hyperlinks to other HTML files stored on the web server or references to entry points in kiosk command files, also stored on the web server, which will be described in more detail below.

The navigation section 52 also comprises touchscreen buttons, but for allowing a user to navigate through web pages being displayed by the web browser. That is, the navigation section 52 comprises a "forward" touchscreen button 62, a "backward" touchscreen button 64, and a "home page" touchscreen button 66 for allowing a user to select a next web page, a previous web page, and a home page, respectively, for display by the web browser. Of course, the navigation section 52 may comprise other navigation-related touchscreeen buttons.

The imaging section 54 displays an image 68 being captured by the video camera 16. The image 68 may include a frame around an area of the image that has been determined to contain an object of interest in accordance with the above-referenced image processing techniques. For example, the imaging section 54 of FIG. 3 includes a frame 70 around a human 72.

The animation section 56 typically comprises a computer generated face 74. As shown, the computer generated face 74 may comprise all of the features of a human face such as, for example, a forehead, cheeks, mouth, nose, etc. Alternatively, the computer generated face 74 may comprise other than human features. That is, the animation section 56 may comprise a computer generated face having human, subhuman, real, imaginary, or any number of a variety features. The presentation of such a computer generated face 74 in the animation section 56 of the interactive display can be accomplished by using the presentation technique that has been described in U.S. patent application Ser. No. 09/071,037, entitled *Technique for Controlling a Presentation of a Computer Generated Object Having a Plurality of Movable Components,* filed by Christian et al. on May 4, 1998, and which is hereby incorporated herein by reference. The presentation technique disclosed therein allows a presentation of a computer generated face to be controlled through the processing of a text file containing configuration elements, gesture elements, and audio elements. Each configuration element in the text file is processed such that a corresponding characteristic (e.g., face type, voice type, speech rate) of a computer generated face is utilized during a presentation of the computer generated face. Each gesture element in the text file is processed such that a corresponding gesture (e.g., smile, wink, frown) is performed during a presentation of the computer generated face. Each audio element in the text file is processed such that an associated audio signal (e.g., a voice) is generated during a presentation of the computer generated face. Such a presentation technique can be incorporated into the present invention to control the kiosk 10 in accordance with the present invention.

The above-referenced presentation technique can be incorporated into the present invention by storing similar text files (i.e., text files containing configuration elements, gesture elements, and audio elements) on the portion of the processing device 36 that is configured as the web server. These text files, along with the HTML files described above, are assigned universal resource locator (URL) addresses on the web server. The processing device 36 can then access these files (i.e., both the text files and the HTML files) by referring to their corresponding URL addresses.

The processing device 36 will access the above-described text files and HTML files, as well as other objects, when so instructed by kiosk commands within a kiosk command file. Such kiosk commands are specific to the operation of the kiosk 10. That is, such kiosk commands are processed by the processing device 36 so as to control the operation of the kiosk 10 in accordance with the present invention. Referring to Table 1, the syntax for each of the kiosk commands within a kiosk command file is listed.

TABLE 1 html URL [no] - commands web browser to display web page at specified URL.
talk URL - commands processing of file at specified URL.
say text - commands speech synthesization of specified text.
pause time - commands suspension of further processing of command file for specified time.
label name - labels an entry point in a command file.
goto URL @label-name - commands jumping to specified entry point at specified URL.
cgi URL - commands execution of cgi script at specified URL.
exec command - commands execution of the specified command.
module module-name - commands loading of specified module.
exit - commands exiting the current module.

The processing device 36 processes the html command so that a web page will be displayed on the touchscreen monitor 14 by the web browser. That is, the html command is processed by the processing device 36 as a command to have the web browser display a web page, the contents of which are located at the specified URL address on the web server. The specified URL address may be a relative reference or an absolute reference. Relative references are taken with respect to the current kiosk command file, while absolute references are taken with respect to the entire processing system 30, and beyond (e.g., an internet address). The html command has an optional parameter (i.e., "no") which, when appended to the end of the html command, causes the specified URL address to not be added to a history list maintained by the processing device 36.

It should be noted that the URL address specified in the html command could alternatively reference a CGI script which, when executed, will return a valid HTML file.

It should also be noted that the html command is an asynchronous command. That is, the html command is processed by the processing device 36 such that the processing device 36 can begin processing a subsequent kiosk command before completing the processing of the html command. For example, while the processing device 36 is processing an html command to have the web browser display a web page on the touchscreen monitor 14, the processing device can process a talk command to control the presentation of a computer generated face in the animation section 56 of the interactive display and an associated audio signal (e.g., a voice) at the pair of speakers 20, as described in more detail below.

The processing device 36 processes the talk command so that a file will be processed by the processing device 36. That is, the talk command is processed by the processing device 36 as a command to have the processing device 36 process a file located at the specified URL address. The specified file can be a text file which can be processed by the processing device 36 in accordance with the presentation technique described in U.S. patent application Ser. No. 09/071,037, which was previously incorporated herein by reference. Thus, the processing device 36 can process the specified text file so as to control the presentation of a computer generated face in the animation section 56 of the interactive display and an associated audio signal (e.g., a voice) at the pair of speakers 20.

It should be noted that other types of files besides text files can be processed by the processing device 36 when the processing device 36 is processing the talk command. For example, the specified file can be an annotated audio file which can be processed by the processing device 36. Such an annotated audio file is described in U.S. patent application Ser. No. 08/804,761, entitled Automated Speech Alignment for Image Synthesis, filed by Goldenthal et al. on Feb. 24, 1997, and which is hereby incorporated herein by reference.

It should also be noted that, as with the html command, the URL address specified in the talk command may be a relative reference or an absolute reference. Again, relative references are taken with respect to the current kiosk command file, while absolute references are taken with respect to the entire processing system 30, and beyond (e.g., an internet address).

It should further be noted that the URL address specified in the talk command could alternatively reference a CGI script which, when executed, will return a valid file to be processed by the processing device 36.

It should additionally be noted that the talk command is a synchronous command. That is, the talk command is processed by the processing device 36 such that the processing device 36 can not begin processing a subsequent kiosk command before completing the processing of the talk command, unless interrupted by a logged event as described in more detail below. For example, the processing device can not process a say command to control the presentation of a computer generated face in the animation section 56 of the interactive display and an associated audio signal (e.g., a voice) at the pair of speakers 20, as described in more detail below, while the processing device 36 is processing an talk command to control the presentation of a computer generated face in the animation section 56 of the interactive display and an associated audio signal (e.g., a voice) at the pair of speakers 20. Otherwise, if such commands were concurrently processed, a distortion would result in the presentation of the computer generated face in the animation section 56 of the interactive display and the associated audio signal (e.g., a voice) at the pair of speakers 20.

The processing device 36 processes the say command so that the specified text will be processed by the processing device 36. That is, the say command is processed by the processing device 36 as a command to have the processing device 36 process the specified text. The specified text can be processed by the processing device 36 in accordance with the presentation technique described in U.S. patent application Ser. No. 09/071,037, which was previously incorporated herein by reference. Thus, the processing device 36 can process the specified text so as to control the presentation of a computer generated face in the animation section 56 of the interactive display and an associated audio signal (e.g., a voice) at the pair of speakers 20.

It should be noted that, similar to the talk command, the say command is a synchronous command. That is, the say command is processed by the processing device 36 such that the processing device 36 can not begin processing a subsequent kiosk command before completing the processing of the say command, unless interrupted by a logged event as described in more detail below. For example, the processing device can not process a talk command to control the presentation of a computer generated face in the animation section 56 of the interactive display and an associated audio signal (e.g., a voice) at the pair of speakers 20, while the processing device 36 is processing a say command to control the presentation of a computer generated face in the animation section 56 of the interactive display and an associated audio signal (e.g., a voice) at the pair of speakers 20. Otherwise, if such commands were concurrently processed, a distortion would result in the presentation of the computer generated face in the animation section 56 of the interactive display and the associated audio signal (e.g., a voice) at the pair of speakers 20.

The processing device 36 processes the pause command so that the processing device 36 will suspend all further processing of kiosk commands in the kiosk command file for the specified time period. That is, the pause command is processed by the processing device 36 as a command to have the processing device 36 suspend all further processing of kiosk commands in the kiosk command file until the specified time period has elapsed.

It should be noted that the specified time is measured in milliseconds. For example, a kiosk command of "pause 20000" will cause the processing device 36 to suspend all further processing of kiosk commands in the kiosk command file until 20 seconds has elapsed. However, it should also be noted that button selections made on the touchscreen monitor 14 during the time that the processing device 36 is suspended due to a pause command are immediately processed.

It should further be noted that, by its very nature, the pause command is a synchronous command. That is, the pause command is processed by the processing device 36 such that the processing device 36 can not begin processing a subsequent kiosk command before completing the processing of the pause command, unless interrupted by a logged event as described in more detail below.

The processing device 36 does not necessarily process a label command, but rather recognizes a label command as an entry point in a kiosk command file. That is, a label command provides an entry point into a kiosk command file, and a place where history can be marked by the processing device 36. The specified name in a label command can be any printable ASCII text, except for white space characters (space, tab, newline, carriage return) and the "@" character.

The processing device 36 processes the goto command so that the processing device 36 jumps to the specified entry point in a file located at the specified URL address. That is, the goto command is processed by the processing device 36 as a command to jump to the specified entry point in a file located at the specified URL address. The goto command can take one of three forms. First, the goto command can reference a label within the current kiosk command file (e.g., "@label-name"). Second, the goto command can reference a file located at the specified URL address (e.g., "URL"). Third, the goto command can reference a label within a file located at the specified URL address (e.g., "URL @label-name").

It should be noted that the URL address specified in the goto command could alternatively reference a CGI script which, when executed, will jump to the specified entry point in a file located at the specified URL address.

It should also be noted that, as with the html command, the URL address specified in the goto command may be a relative reference or an absolute reference. Again, relative references are taken with respect to the current kiosk command file, while absolute references are taken with respect to the entire processing system 30, and beyond (e.g., an internet address).

It should further be noted that, similar to the pause command, the goto command is an inherently synchronous command. That is, the goto command is processed by the processing device 36 such that the processing device 36 can not begin processing a subsequent kiosk command before completing the processing of the goto command. This is the case since the processing device 36 does not know the location of the subsequent kiosk command until directed by the goto command.

The processing device 36 processes the cgi command so that a cgi script will be executed by the processing device 36. That is, the cgi command is processed by the processing device 36 as a command to have the processing device 36 execute a cgi script located at the specified URL address.

It should be noted that, as with the html command, the URL address specified in the cgi command may be a relative reference or an absolute reference. Again, relative references are taken with respect to the current kiosk command file, while absolute references are taken with respect to the entire processing system 30, and beyond (e.g., an internet address).

It should also be noted that the cgi command is a synchronous command. That is, the cgi command is processed by the processing device 36 such that the processing device 36 can not begin processing a subsequent kiosk command until the execution results of the cgi script are returned, unless interrupted by a logged event as described in more detail below. However, it should further be noted that any execution results which are returned from the executed cgi script are generally discarded.

The processing device 36 processes the exec command so that a command will be executed by the processing device 36. That is, the exec command is processed by the processing device 36 as a command to have the processing device 36 execute the specified command. Such a specified command is typically associated with the operating system of the processing device 36. For example, if the processing device 36 is running a Unix operating system, the exec command will be processed by the processing device 36 as a command to have the processing device 36 execute the specified Unix command.

It should be noted that the exec command is an asynchronous command. That is, the exec command is processed by the processing device 36 such that the processing device 36 can begin processing a subsequent kiosk command before the execution results of the executed operating system command are returned. However, it should also be noted that any execution results which are returned from the executed operating system command are generally discarded.

The processing device 36 processes the module command so that a module is loaded by the processing device 36. That is, the module command is processed by the processing device 36 as a command to have the processing device 36 load the specified module. Such a specified module is an executable module associated with the behavior of the kiosk 10. Once loaded, the specified module is processed by the processing device 36 and has complete control of the kiosk 10. The processing of the specified module typically involves calling kiosk command files, which are themselves processed by the processing device 36. After the specified module has been fully processed by the processing device 36, control of the kiosk 10 is typically passed back to the kiosk command file which invoked the module command.

It should be noted that, similar to the pause and goto commands, the module command is an inherently synchronous command. That is, the module command is processed by the processing device 36 such that the processing device 36 can not begin processing a subsequent kiosk command before completing the processing of the module command. This is the case since the processing device 36 does not know the location of the subsequent kiosk command until directed by the module command.

The processing device 36 processes the exit command so that the processing device 36 exits the current module. That is, the exit command is processed by the processing device 36 as a command to have the processing device 36 exit the current module. The processing device 36 should thereby return to the executable module which loaded the current module in order to continue processing the executable module. As previously described, the processing of the executable module typically involves calling kiosk command files, which are themselves processed by the processing device 36.

It should be noted that, similar to the pause, goto, and module commands, the exit command is an inherently synchronous command. That is, the exit command is processed by the processing device 36 such that the processing device 36 can not begin processing a subsequent kiosk command before completing the processing of the exit command. This is the case since the processing device 36 must exit the current module and return to the executable module which called the current module before the location of the subsequent kiosk command is known by the processing device 36.

As noted above, some of the above-described kiosk commands are classified as synchronous commands, while others are classified as asynchronous commands. However, all of the above-described commands are temporally ordered commands in that all of the above-described commands require some amount of time to be processed by the processing device 36, and are processed by the processing device 36 in some particular order. Notwithstanding, the processing device 36 can not begin processing subsequent kiosk commands before completing the processing of some temporally ordered commands (i.e., synchronous commands), while the processing device 36 can begin processing subsequent kiosk commands before completing the processing of other temporally ordered commands (i.e., asynchronous commands).

The above-described kiosk commands are included in kiosk command files so as to allow processing by the processing device 36, which thereby controls the operation of the kiosk 10 in accordance with the present invention. Similar to the text files and the HTML files described above, the kiosk command files are stored on the portion of the processing device 36 that is configured as the web server. The kiosk command files are also assigned URL addresses on the web server. Thus, the processing device 36 can also then access the kiosk command files by referring to their corresponding URL addresses.

Referring to Table 2, a sample of a kiosk command file (i.e., main.kml) is listed. It should initially be noted that comment lines in a kiosk command file must begin with a "#", and that only comments must appear on a comment line (i.e., no kiosk commands). Also, blank lines are permitted in kiosk command files. However, everything else will be interpreted as a kiosk command.

TABLE 2

```
#     main.kml sample kiosk command file
html start-page.html
say <frown> Don't push the button!
pause 10000
say Don't even think about it!
pause 5000
html reward-page.html
say <smile> Good doggie!
label EXIT-POINT
say Goodbye!
goto ../other-file.kml @SOMEWHERE
label PUSHED-IT
html punish-page.html
talk punish.talk
goto @EXIT-POINT
```

Figure 4:
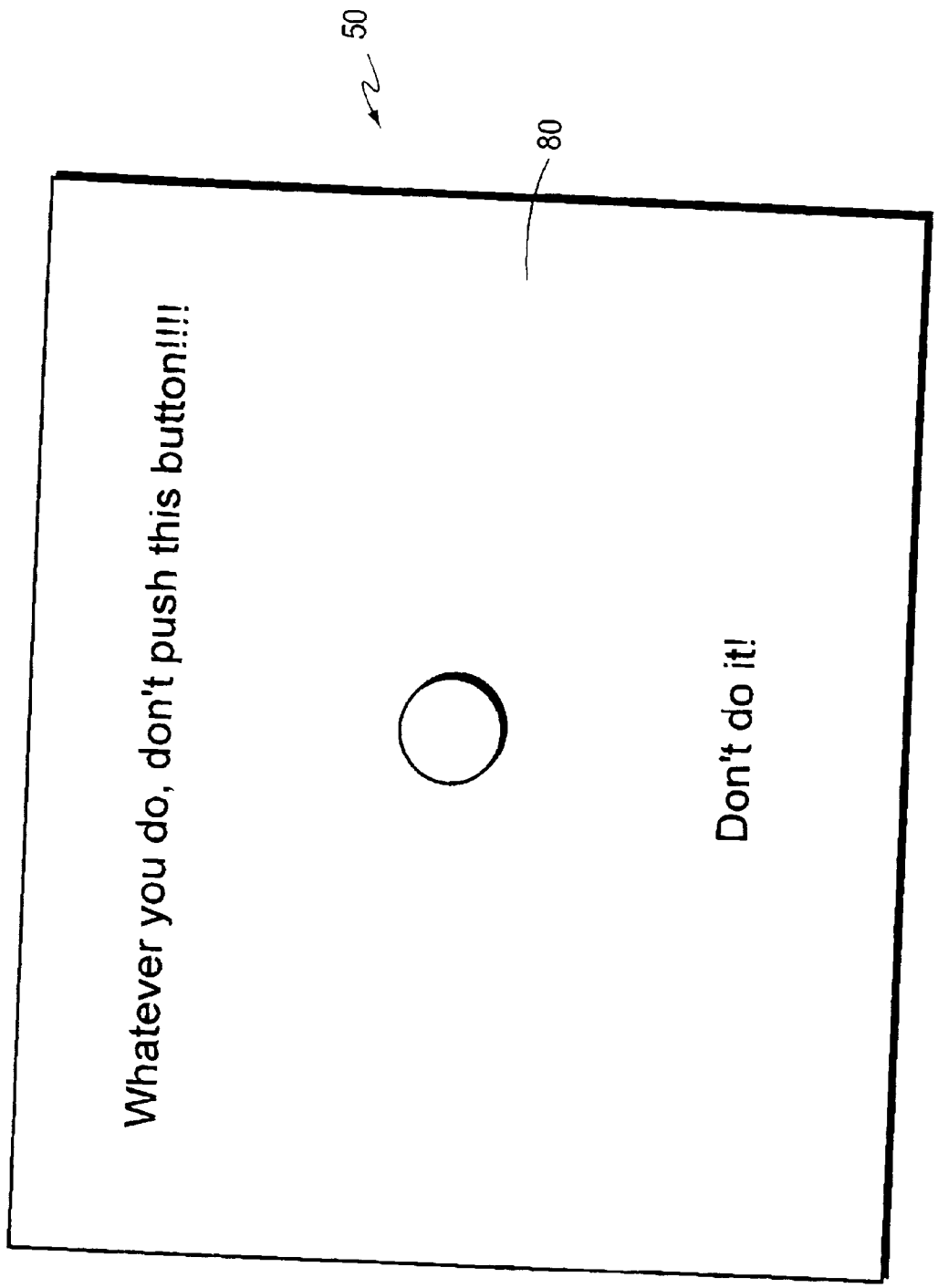
FIG. 4 shows a web page being displayed in a textual and graphical information section of an interactive display in accordance with the present invention.

The processing device 36 processes the main.kml kiosk command file by first causing the web browser to display the web page "start-page.html" in the textual and graphical information section 50, which is shown in FIG. 4. The "start-page.html" web page comprises a touchscreen button 80, which references the "main.kml @PUSHED-IT" entry point within the main.kml sample kiosk command file.

The processing device 36 next causes the computer generated face 74 to frown and say "Don't push the button!". The processing device 36 causes the computer generated face 74 to frown by using the simple textual gesture element <frown> as defined in U.S. patent application Ser. No. 09/071,037, which was previously incorporated herein by reference. The processing device 36 causes the computer generated face 74 to say "Don't push the button!" by processing the specified text in accordance with the presentation technique described in U.S. patent application Ser. No. 09/071,037, which was previously incorporated herein by reference. Thus, the processing device 36 processes the simple textual gesture element <frown> and the specified text so as to control the presentation of the computer generated face 74 in the animation section 56 of the interactive display and an associated audio signal (e.g., a voice) at the pair of speakers 20.

The processing device 36 next suspends all further processing of kiosk commands in the main.kml kiosk command file for 10 seconds in accordance with the processing of the pause command (i.e., the "pause 10000" command). The processing device 36 then causes the computer generated face 74 to say "Don't even think about it!" by processing the specified text in accordance with the presentation technique described in U.S. patent application Ser. No. 09/071,037, which was previously incorporated herein by reference. Thus, the processing device 36 processes the specified text so as to control the presentation of the computer generated face 74 in the animation section 56 of the interactive display and an associated audio signal (e.g., a voice) at the pair of speakers 20.

The processing device 36 next suspends all further processing of kiosk commands in the main.kml kiosk command file for 5 seconds in accordance with the processing of the pause command (i.e., the "pause 5000" command). The processing device 36 then causes the web browser to display the web page "reward-page.html" in the textual and graphical information section 50 of the interactive display. The "reward-page.html" web page contains, for example, a cute puppy.

The processing device 36 next causes the computer generated face 74 to smile and say "Good doggie!". The processing device 36 causes the computer generated face 74 to smile by using the simple textual gesture element <smile> as defined in U.S. patent application Ser. No. 09/071,037, which was previously incorporated herein by reference. The processing device 36 causes the computer generated face 74 to say "Good doggie!" by processing the specified text in accordance with the presentation technique described in U.S. patent application Ser. No. 09/071,037, which was previously incorporated herein by reference. Thus, the processing device 36 processes the simple textual gesture element <smile> and the specified text so as to control the presentation of the computer generated face 74 in the animation section 56 of the interactive display and an associated audio signal (e.g., a voice) at the pair of speakers 20.

The processing device 36 next skips over the label "EXIT-POINT" and causes the computer generated face 74 to say "Goodbye!". The processing device 36 causes the computer generated face 74 to say "Goodbye!" by processing the specified text in accordance with the presentation technique described in U.S. patent application Ser. No. 09/071,037, which was previously incorporated herein by reference. Thus, the processing device 36 processes the specified text so as to control the presentation of the computer generated face 74 in the animation section 56 of the interactive display and an associated audio signal (e.g., a voice) at the pair of speakers 20.

The processing device 36 next jumps to a location labeled "SOMEWHERE" in a kiosk command file named "other-file.kml". The processing device 36 then begins to process kiosk commands in the "other-file.kml" kiosk command file.

At this point it should be noted that the processing device 36 comprises an event queue for logging events which are detectable by the public kiosk 10. If an event is logged in the event queue, the processing device 36 processes the event in the appropriate manner. For example, as previously mentioned, the touchscreen button 80 displayed with the "start-page.html" web page references the "main.kml @PUSHED-IT" entry point within the main.kml sample kiosk command file. Thus, if a user presses the touchscreen button 80 when the "start-page.html" web page is being displayed on the touchscreen monitor 14, the processing device 36 will log this event in the event queue. The processing device will then process the logged event by jumping to the location labeled "PUSHED-IT" in the main.kml sample kiosk command file. The processing device 36 will then cause the web browser to display the web page "punish-page.html" in the textual and graphical information section 50. The "punish-page.html" web page contains, for example, a mean attack dog.

The processing device 36 will next process the "punish.talk" file. The processing device 36 processes the "punish.talk" file in accordance with the presentation technique described in U.S. patent application Ser. No. 09/071,037, which was previously incorporated herein by reference. Thus, the processing device 36 processes the "punish.talk" file so as to control the presentation of the computer generated face 74 in the animation section 56 of the interactive display and an associated audio signal (e.g., a voice) at the pair of speakers 20.

At this point it should be noted that a logged event will be immediately processed by the processing device 36 regardless of the type of temporally ordered command currently being processed by the processing device 36. That is, the logged event will be processed by the processing device 36 simultaneously with the temporally ordered command currently being processed by the processing device 36. Further, if the processing of the logged event relates in some manner to the processing of the temporally ordered command currently being processed by the processing device 36, then the processing device 36 may cut short the processing of the temporally ordered command currently being processed by the processing device 36 and process the logged event in a manner that overrides the processing of the temporally ordered command.

After the processing device 36 has processed the "punish.talk" file, the processing device 36 will jump to the location labeled "EXIT-POINT" in the main.kml sample kiosk command file. The processing device 36 will then cause the computer generated face 74 to say "Goodbye!". As previously indicated, the processing device 36 causes the computer generated face 74 to say "Goodbye!" by processing the specified text in accordance with the presentation technique described in U.S. patent application Ser. No. 09/071,037, which was previously incorporated herein by reference. Thus, the processing device 36 processes the specified text so as to control the presentation of the computer generated face 74 in the animation section 56 of the interactive display and an associated audio signal (e.g., a voice) at the pair of speakers 20.

The processing device 36 will next jump to the location labeled "SOMEWHERE" in the kiosk command file named "other-file.kml". The processing device 36 will then begin to process kiosk commands in the "other-file.kml" kiosk command file.

At this point it should be noted that, similar to the touchscreen button 80, input data from other components in the data processing system 30, namely, the video camera 16, the keyboard 32, and the microphone 34, can also reference entry points in kiosk command files stored on the web server. For example, an object recognition algorithm running on the processing device 36 can reference an entry point in a kiosk command file every time an object is recognized in a image captured by the video camera 16. Also, a command recognition algorithm running on the processing device 36 can reference an entry point in a kiosk command file every time a command is typed on the keyboard 32. Furthermore, a speech recognition algorithm running on the processing device 36 can reference an entry point in a kiosk command file every time a particular word or phrase is recognized from a voice signal detected by the microphone 34.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. A method for controlling an interactive presentation, the method comprising the steps of:

receiving at least one of a plurality of commands, the at least one of the plurality of commands corresponding to a respective operation, the performance of which is directly associated with controlling a section of the interactive presentation;

processing the received at least one of a plurality of commands such that the cor-responding operation is performed to control the section of the interactive presentation;

detecting a stimulus event;

logging the detected stimulus event in an event queue; and processing the detected stimulus event one of simultaneously with and in a manner that overrides processing of the received at least one of a plurality of commands.

2. The method as defined in claim 1, wherein the step of receiving at least one of the plurality of commands includes receiving at least two of the plurality of commands in a sequential order, wherein the step of processing each of the received commands includes processing each of the received commands in the sequential order.

3. The method as defined in claim 2, wherein:

a first of the at least two received commands is received as a first command in the sequential order and is for performing a corresponding synchronous operation;

a second of the at least two received commands is received as a second command in the sequential order; and the second command is processed only after the synchronous operation corresponding to the first command is performed in its entirety.

4. The method as defined in claim 3, wherein the processing of the first command includes processing a referenced file.

5. The method as defined in claim 3, wherein the processing of the first command includes processing associated text.

6. The method as defined in claim 3, wherein the processing of the first command includes suspending the processing of all commands subsequent to the first command in the sequential order for a specified time period.

7. The method as defined in claim 2, wherein:

a first of the at least two received commands is received as a first in the sequential order and is for performing a corresponding asynchronous operation;

a second of the at least two received commands is received as a second command in the sequential order; and the second command is processed before the asynchronous operation corresponding to the first command is performed in its entirety.

8. The method as defined in claim 7, wherein the processing of the first command includes processing a referenced file.

9. The method as defined in claim 8, wherein the referenced file is an HTML file.

10. The method as defined in claim 1, wherein each of the received commands includes an operational parameter.

11. The method as defined in claim 10, wherein the operational parameter is an absolute reference.

12. The method as defined in claim 11, wherein the absolute reference is an URL.

13. The method as defined in claim 10, wherein the operational parameter is a relative reference.

14. The method as defined in claim 13, wherein the relative reference is an URL.

15. The method as defined in claim 10, wherein the operational parameter is text.

16. The method as defined in claim 10, wherein the operational parameter is an operating system command.

17. The method as defined in claim 10, wherein the operational parameter is a file reference.

18. The method as defined in claim 1, wherein the step of processing the logged detected stimulus event includes referencing a file.

19. The method as defined in claim 1, wherein the step of processing the logged detected stimulus event includes referencing a location within a file.

20. An apparatus for controlling an interactive presentation, the apparatus comprising:
   a receiver for receiving at least one of a plurality of commands, the at least one of the plurality of commands corresponding to a respective operation, the performance of which is directly associated with controlling a section of the interactive presentation;
   an instruction storage device for storing a plurality of instructions; and
   a processor connected to the instruction storage device, the processor for reading the plurality of instructions and thereby:
   process the at last one of plurality of commands such that the corresponding operation is performed to control the section of the interactive presentation:
   detecting a stimulus event;
   logging the detected stimulus event in an event queue; and
   processing the detected stimulus event one of simultaneously with and in a manner that overrides processing of the received at least one of the plurality of commands.

21. The apparatus as defined in claim 20, wherein the receiver receives at least two of the plurality of commands in a sequential order, wherein the processor processes each of the received commands in the sequential order.

22. The apparatus as defined in claim 21, wherein:
   a first of the at least two received commands is received as a first command in the sequential order and is for performing a corresponding synchronous operation;
   a second of the at least two received commands is received as a second command in the sequential order; and
   the second command is processed only after the synchronous operation corresponding to the first command is performed in its entirety.

23. The apparatus as defined in claim 22, wherein the processor processes the first command by processing a referenced file.

24. The apparatus as defined in claim 22, wherein the processor processes the first command by processing associated text.

25. The apparatus as defined in claim 22, wherein the processor processes the first command by suspending the processing of all commands subsequent to the first command in the sequential order for a specified time period.

26. The apparatus as defined in claim 21, wherein:
   a first of the at least two received commands is received as a first in the sequential order and is for performing a corresponding asynchronous operation;
   a second of the at least two received commands is received as a second command in the sequential order; and
   the second command is processed before the asynchronous operation corresponding to the first command is performed in its entirety.

27. The apparatus as defined in claim 26, wherein the processor processes the first command by processing a referenced file.

28. The apparatus as defined in claim 27, wherein the referenced file is an HTML file.

29. The apparatus as defined in claim 20, wherein each of the received commands includes an operational parameter.

30. The apparatus as defined in claim 29, wherein the operational parameter is an absolute reference.

31. The apparatus as defined in claim 30, wherein the absolute reference is an URL.

32. The apparatus as defined in claim 29, wherein the operational parameter is a relative reference.

33. The apparatus as defined in claim 32, wherein the relative reference is an URL.

34. The apparatus as defined in claim 29, wherein the operational parameter is text.

35. The apparatus as defined in claim 29, wherein the operational parameter is an operating system command.

36. The apparatus as defined in claim 29, wherein the operational parameter is a file reference.

37. The apparatus as defined in claim 20, wherein the processor processes the logged detected stimulus event by referencing a file.

38. The apparatus as defined in claim 20, wherein the processor processes the logged detected stimulus event by referencing a location within a file.

39. An article of manufacture for controlling an interactive presentation, the article of manufacture comprising:
   a computer readable storage medium; and
   computer programming stored on the storage medium; wherein the stored computer programming is configured to be readable from the computer readable storage medium by a computer and thereby cause the computer to operate so as to:
   receive at least one of a plurality of commands, the at least one of the plurality of commands corresponding to a respective operation the performance of which is directly associated with controlling a section of the interactive presentation;
   initiate processing of the at least one of the plurality of commands such that the corresponding operation is performed to control the section of the interactive presentation;
   detect a stimulus event;
   log the detected stimulus event in an event queue;
   suspend processing of the at least one of the plurality of commands responsive to logging the detected stimulus event; and process the detected stimulus event.

40. The article of manufacture as defined in claim 39, further causing the computer to operate so as to:

receive at least two of the plurality of commands in a sequential order; and process each of the received commands in the sequential order.

41. The article of manufacture as defined in claim 40, wherein:

a first of the at least two received commands is received as a first command in the sequential order and is for performing a corresponding synchronous operation;

a second of the at least two received commands is received as a second command in the sequential order; and the second command is processed only after the synchronous operation corresponding to the first command is performed in its entirety.

42. The article of manufacture as defined in claim 41, further causing the computer to operate so as to:

process the first command by processing a referenced file.

43. The article of manufacture as defined in claim 41, further causing the computer to operate so as to process the first command by processing associated text.

44. The article of manufacture as defined in claim 41, further causing the computer to operate so as to process the first command by suspending the processing of all commands subsequent to the first command in the sequential order for a specified time period.

45. The article of manufacture as defined in claim 40, wherein:

a first of the at least two received commands is received as a first in the sequential order and is for performing a corresponding asynchronous operation;

a second of the at least two received commands is received as a second command in the sequential order; and the second command is processed before the asynchronous operation corresponding to the first command is performed in its entirety.

46. The article of manufacture as defined in claim 45, further causing the computer to operate so as to process the first command by processing a referenced file.

47. The article of manufacture as defined in claim 46, wherein the referenced file is an HTML file.

48. The article of manufacture as defined in claim 39, wherein each of the received commands includes an operational parameter.

49. The article of manufacture as defined in claim 48, wherein the operational parameter is an absolute reference.

50. The article of manufacture as defined in claim 49, wherein the absolute reference is an URL.

51. The article of manufacture as defined in claim 48, wherein the operational parameter is a relative reference.

52. The article of manufacture as defined in claim 51, wherein the relative reference is an URL.

53. The article of manufacture as defined in claim 48, wherein the operational parameter is text.

54. The article of manufacture as defined in claim 48, wherein the operational parameter is an operating system command.

55. The article of manufacture as defined in claim 48, wherein the operational parameter is a file reference.

56. The article of manufacture as defined in claim 39, further causing the computer to operate so as to process the logged detected stimulus event by referencing a file.

57. The article of manufacture as defined in claim 39, further causing the computer to operate so as to process the logged detected stimulus event by referencing a location within a file.

58. The method as defined in claim 1 wherein the section of the interactive presentation comprises one of a textual and graphical information section a navigation section, and imaging section and an animation section.

59. The apparatus as defined in claim 20 wherein the section of the interactive presentation comprises one of a textual and graphical information section, a navigation section, and imaging section and an animation section.

60. The article of manufacture as defined in claim 39 wherein the section of the interactive presentation comprises one of a textual and graphical information section, a navigation section, and imaging section and an animation section.

\* \* \* \* \*